United States Patent
Ganor et al.

(10) Patent No.: US 6,574,228 B1
(45) Date of Patent: Jun. 3, 2003

(54) COMMUNICATION SYSTEM WITH PHYSICAL INTERFACE AND COMMUNICATION CONTROLLER, AND METHOD

(75) Inventors: Avraham Ganor, Shoham (IL); Avi Hagai, Ranana (IL); Vadim Vayzer, Petach-tikva (IL); Eliyahy Shasha, Holon (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/241,195

(22) Filed: Feb. 1, 1999

(51) Int. Cl.[7] .............................. H04J 3/24; H04L 12/56
(52) U.S. Cl. ..................... 370/395.7; 370/421; 370/463
(58) Field of Search ................................ 370/381, 382, 370/383, 389, 395.1, 395.7, 395.72, 419, 420, 421, 463

(56) References Cited

U.S. PATENT DOCUMENTS

| | | | |
|---|---|---|---|
| 5,418,786 A | | 5/1995 | Loyer et al. ............... 370/94.2 |
| 5,452,330 A | * | 9/1995 | Goldstein .................... 375/257 |
| 5,485,456 A | | 1/1996 | Shtayer et al. ................ 370/60 |
| 5,841,774 A | * | 11/1998 | Flinck et al. ................ 370/399 |
| 5,862,136 A | * | 1/1999 | Irwin .......................... 370/395 |
| 6,426,953 B1 | * | 7/2002 | Benayoun et al. ........ 370/395.1 |

* cited by examiner

Primary Examiner—Alpus H. Hsu

(57) ABSTRACT

A communication system (300) comprises interfaces (311–314) at communication channels (361–364, respectively), coupled to a controller (340) by an address bus (320) and multiplexer (380). The interfaces (311–314) receive data cells and provide status signals (e.g., clav) indicating, for example, cell availability, independently from interface addresses (ADDR) being present at the address bus (320). The interfaces (311–314) continuously send the status signals to the multiplexer (380) which receives the interface address (ADDR) at a control input (386) and forwards the status information of the currently addressed interface to the controller (340).

9 Claims, 5 Drawing Sheets

COMMUNICATION SYSTEM WITH PHYSICAL INTERFACE AND COMMUNICATION CONTROLLER, AND METHOD

FIELD OF THE INVENTION

The present invention generally relates to communication systems, and, more particularly, to a communication system having physical interfaces and a communication controller, and to a method.

BACKGROUND OF THE INVENTION

In many communication systems, a physical interface ("PHY") connects a communication channel (e.g., fiber optic line, phone line, radio link) to a communication controller. Preferably, a single communication controller can serve multiple (e.g., N) interfaces. The controller regularly requests status information from the interfaces (polling).

For example, in a communication system operating in the Asynchronous Transfer Mode (ATM), the channels transfer data in cells (e.g., blocks of bytes). In the terms of ATM, controller, interfaces and channels belong to the so-called physical layer. Many references are dedicated to ATM, such as: [1] Reif O. Onvural: "Asynchronous Transfer Mode, Performance Issues", Second Edition, Artech House Boston and London, 1995, ISBN 0-89006-804-6, especially chapter 2.4 "Physical Layer"; [2] The ATM Forum, Technical Committee: "Utopia Level 2, Version 1.0", June 1995. FIG. 2.3B of [2] illustrates a single ATM (communication controller) and multiple PHYs; [3] U.S. Pat. No. 5,485,456 to Shtayer et al.; and [4] U.S. Pat. No. 5,418,786 to Loyer et al.

Controller and interfaces are often located in different integrated circuits in different packages which are electrically connected by pins, terminals, connectors, wires, or other devices. The number of such connections, hereinafter collectively "pins" influences the total costs of the system and prevents using the full capacity of the controller. Therefore, it is desirable to reduce the pin number.

The present invention seeks to provide an improved communication system which mitigates or avoids these and other disadvantages and limitations of the prior art.

Figure 1:
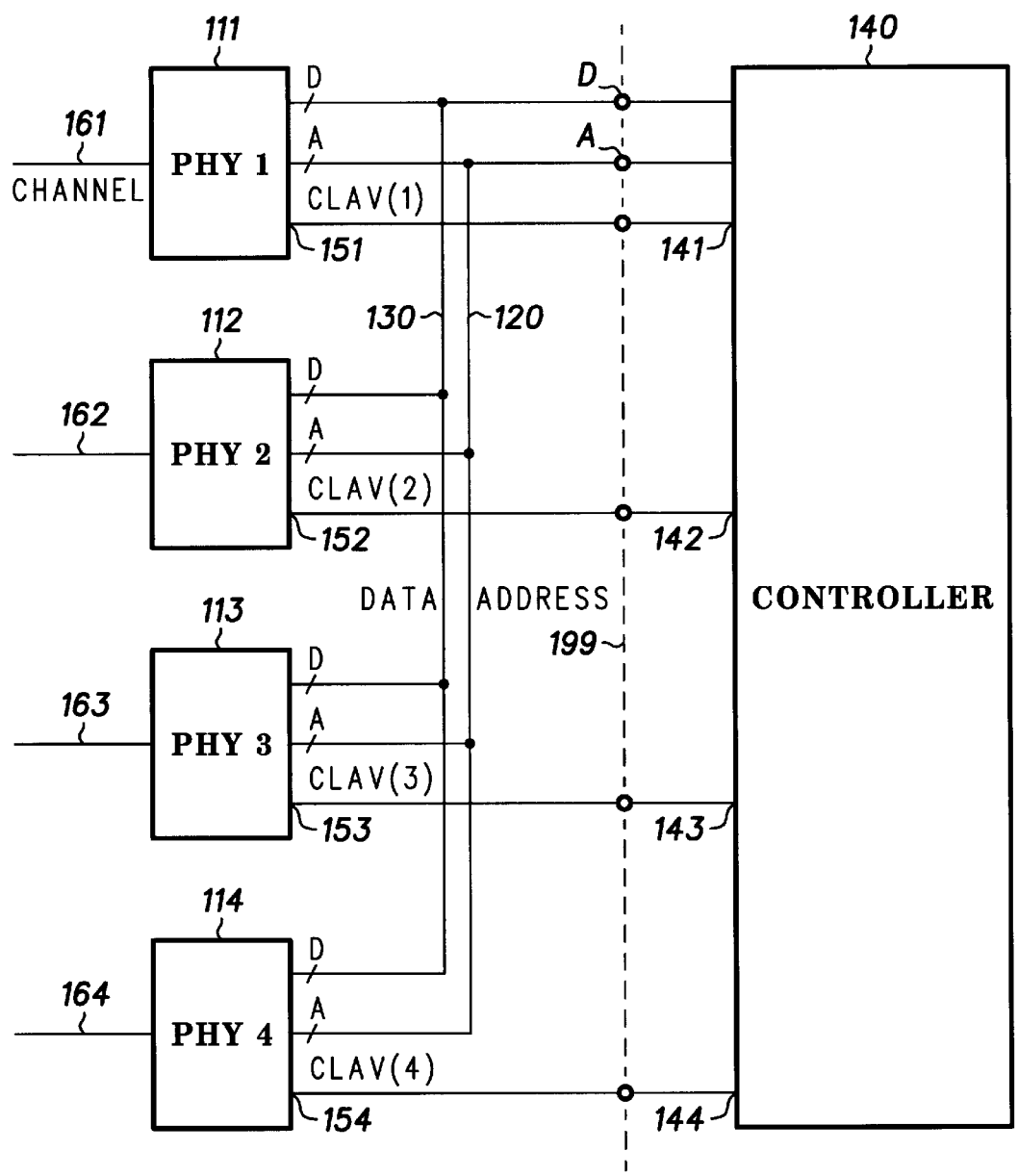
FIG. 1 is a simplified block diagram of a first communication system operating in a direct polling mode.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DETAILED DESCRIPTION OF A PREFERRED EMBODIMENT

The communication system of the present invention (FIGS. 3–6) has advantages over the prior art. Useful in the emerging ATM-market, the system offers cost reduction by reducing pin numbers and simplifying the interfaces. Also, when in operation, a polling cycle can be shortened so that the data throughput can be increased.

FIGS. 1–4 conveniently illustrate communication systems 100/200/300/400 with communication controllers 140/240/340/440 and pluralities of interfaces 111–114/211–214/311–314/411–414 ("PHYs") by non-limiting examples.

In FIGS. 1–4, the leading (left) digit "1", "2", "3" or "4" in the 3-digit reference numbers corresponds to the figure number. Non-leading digits refer to similar elements. However, their function can be different as explained below. In the description, an "X" stands conveniently for "1", "2", "3" or "4" in the leading digit. For example, system X00 stands collectively for systems 100, 200, 300 and 400. The symbol "–" between reference numbers means "from to". For example, interfaces "111–114" stand for interfaces 111, 112, 113, and 114 in FIG. 1.

Figure 2:
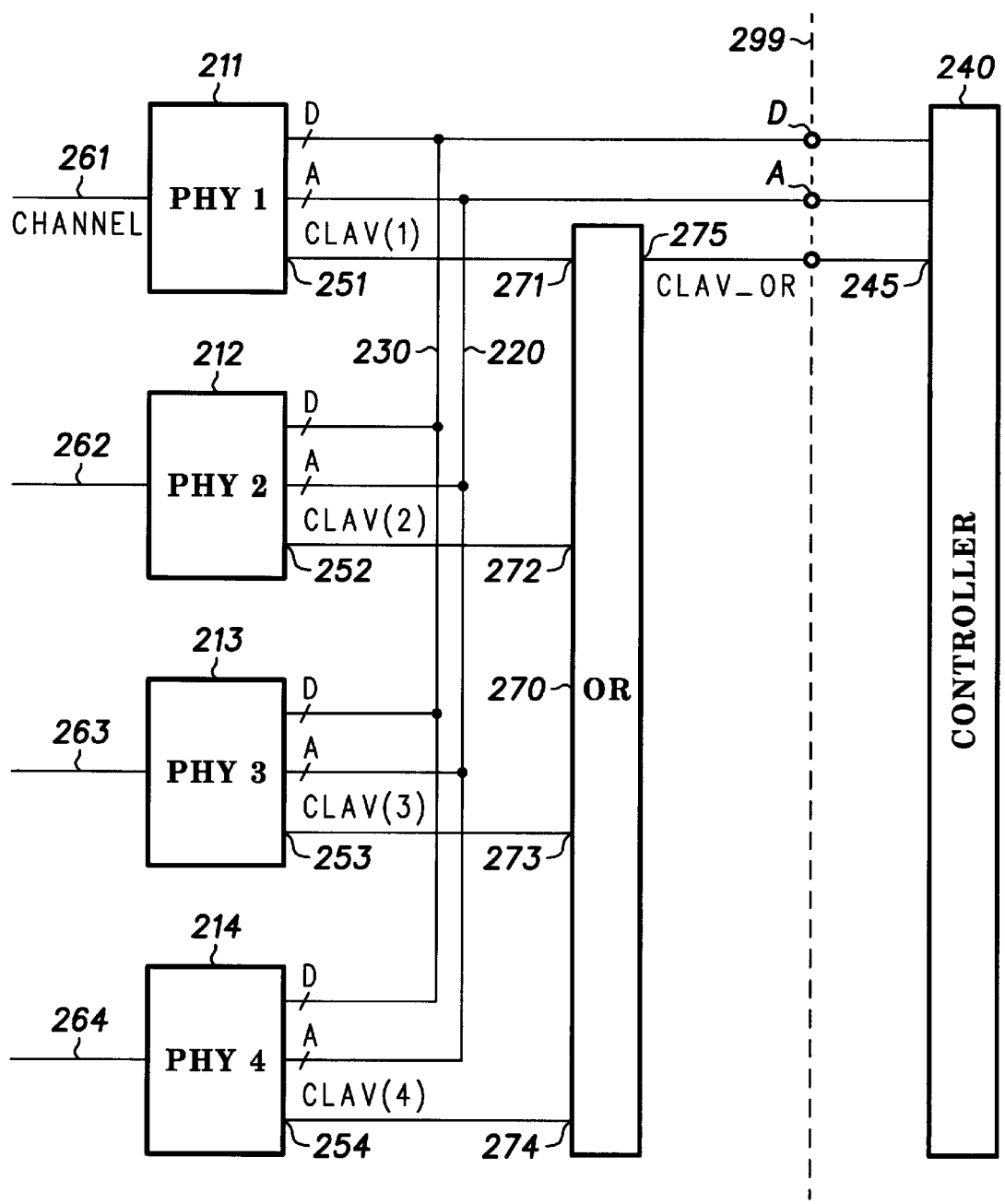
FIG. 2 is a simplified block diagram of a second communication system operating in an address polling mode.
Figure 3:
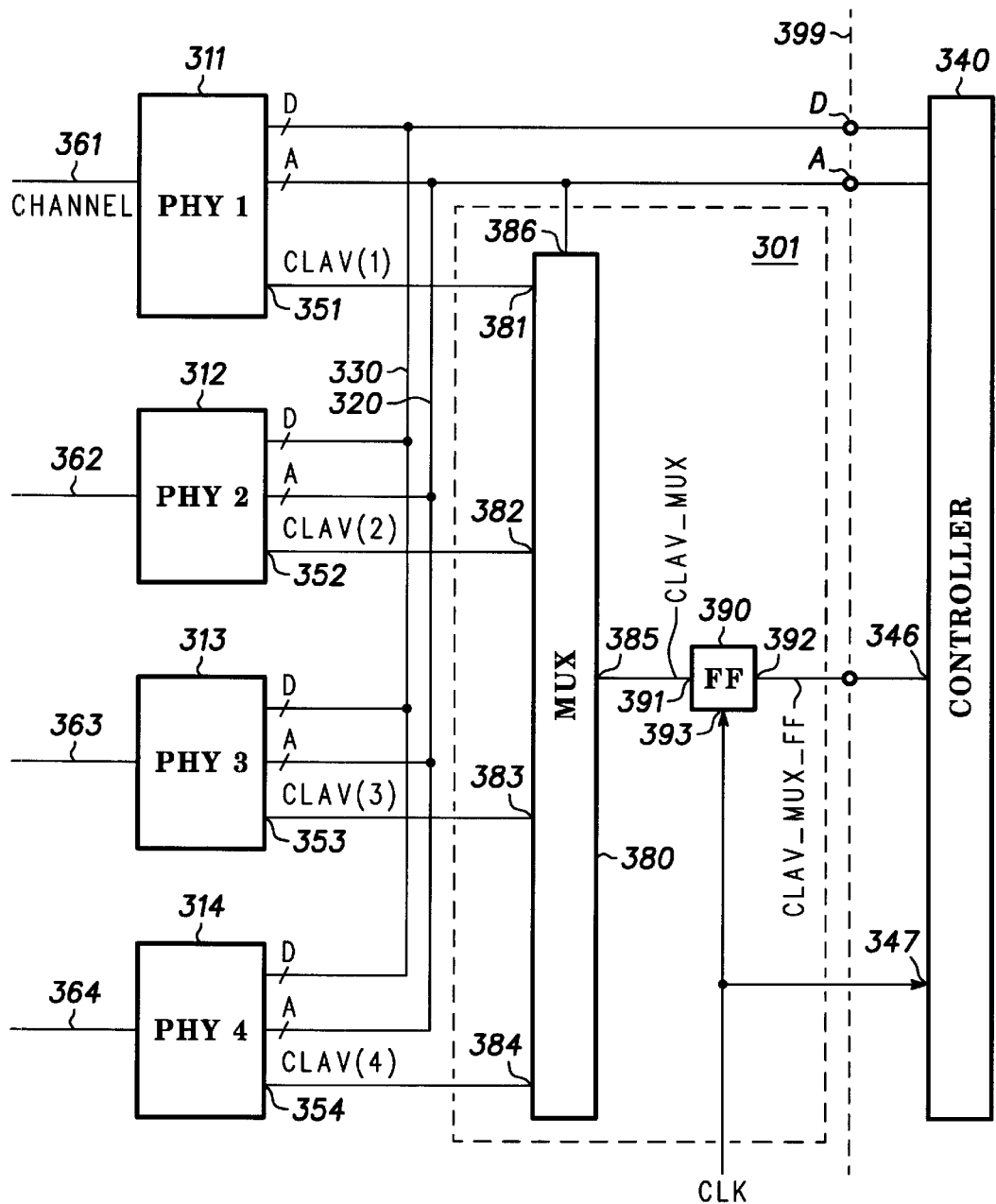
FIG. 3 is a simplified block diagram of a communication system operating in a multiplexed mode in a first embodiment of the present invention.
Figure 4:
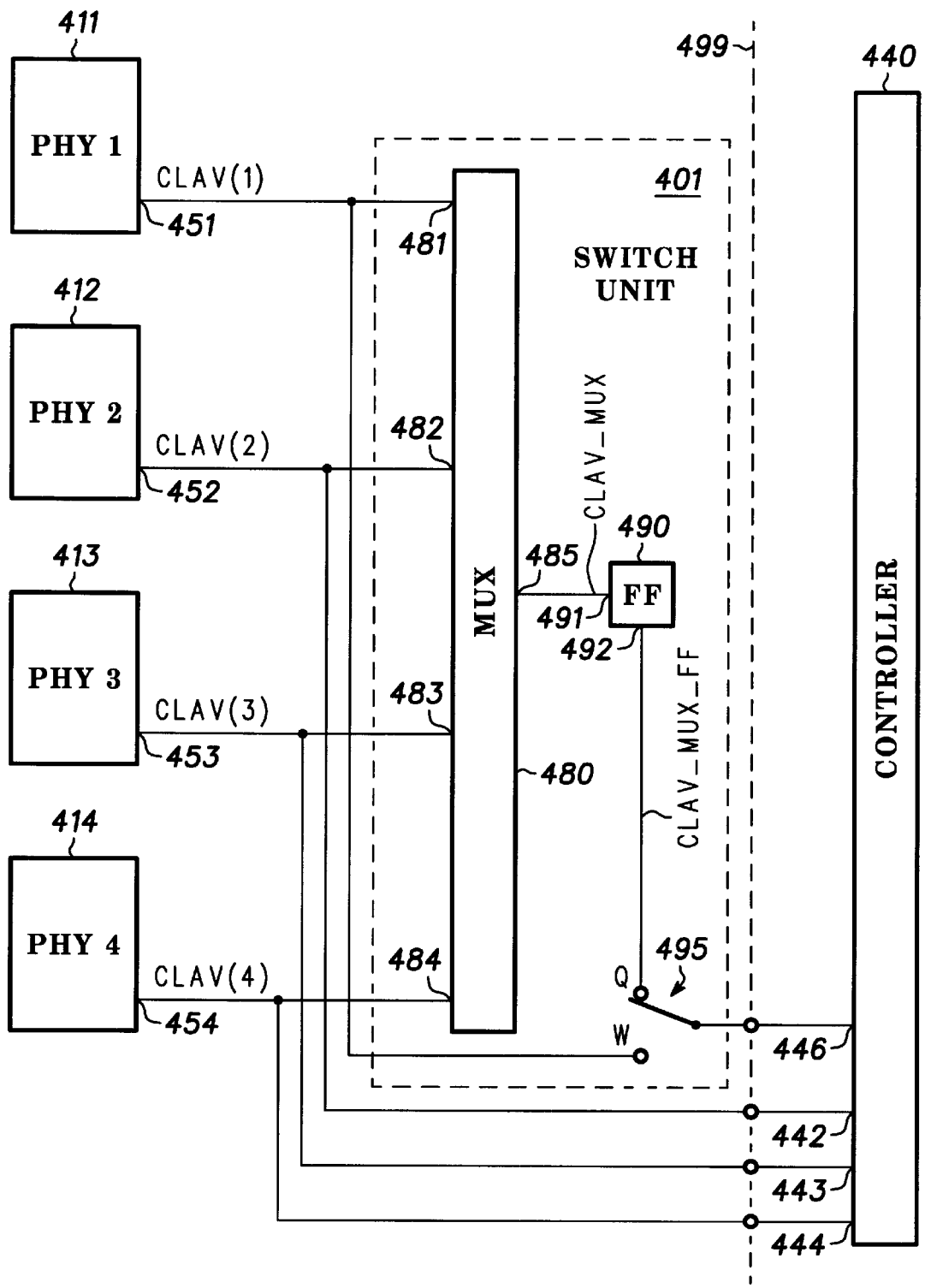
FIG. 4 is a simplified block diagram of a communication system operating in a combined mode in a second embodiment of the present invention.

In system X00, interface X11–X14 share common data bus X30 with controller X40. Therefore, the data transfer between interface and controller is limited. For convenience of explanation, it is assumed, that data from one interface X11, X12, X13, or X14 can be transferred to or from controller X40 at one time. The case where a first interface uses, for example, LSB-bits of the bus and a second interface uses the MSB-bits, is not considered here for convenience, but is not excluded from the scope of the invention. To use data bus X30 effectively, controller X40 polls the interfaces in advance. FIG. 1 illustrates system 100 for a direct polling mode; FIG. 2 illustrates system 200 for an address polling mode; and FIGS. 3–4 illustrates systems 300 and 400 for a multiplexed mode, according to present invention.

Each interface exchanges data with a communication channel and temporarily stores the data in buffers (not illustrated). Depending on the amount of temporarily stored data, each interface provides a status information. For example, in an ATM system, the interface receives data cells from the channel (first transmission direction) or transmit data cells into the channel (second transmission direction). The interface provides the status information as a so-called "clav signal" (from "cell available").

The status information clav can, optionally, distinguish the two data directions. For example, "TxClav" can indicate that the interface is ready to transmit (Tx) data to the channel; and "RxClav" can indicate that the interface is ready to forward the received (Rx) data to the controller. To explain the present invention, such a distinction is, however, not required. For simplicity of explanation and not intended to be limiting, the following is assumed: (a) When the number of cells in the interface buffer equals or exceeds a predetermined number, then the interface is "active" and status information is represented by a clav-bit set to logical "1". (b) Otherwise, the interface is "silent" and the clav-bit is set to logical "0". (c) As multiple interfaces, preferably, operate independently, the clav-bits of the interfaces are conveniently assumed to be independent from each other. Also, in the simplified diagrams of FIGS. 1–4, the number N of interfaces is assumed to be N=4. In real implementation, it is sometimes desired to have N=32 or have even more interfaces coupled to a single controller. Interfaces X11–X14, busses X20, X30 and other elements are, preferably, physically separated from controller X40, as indicated by dashed separation line X99.

Persons of skill in the art are able, based on the description herein, to practice the present invention similarly without departing from the scope of the present invention.

FIG. 1 is a simplified block diagram of communication system 100 (hereinafter "system 100") operating in the direct polling mode. System 100 has interfaces 111–114 ("PHY 1" to "PHY 4"), data bus 130 (e.g., D=8 bits), address bus 120 (e.g., A=2 bits) and communication controller 140 (hereinafter "controller"). Interfaces 111–114 are coupled to communication channels 161 to 164, respectively. Interfaces 111–114 are also coupled to controller 140 via data bus 130 and address bus 120. Status outputs 151–154 of interfaces 111–114, respectively, are coupled to status inputs 141–144 of controller 140, respectively, via status lines for exchanging status signals clav (1) to clav (4).

Preferably, controller 140, busses 120 and 130, and the status lines are coupled together by pins (symbols ○), but this is not essential. In the example, the number $P_1$ of pins is $$P_1 = D + A + N \tag{1}$$

Index 1 stands for system 100. Number $P_1$ linearly rises with the number of interfaces (e.g., 32 interfaces or more). For an efficient system, $P_1$ should be as small as practical.

In the direct mode, system 100 can operate, for example, with the following steps: (i) Interfaces 111–114 receive cells from channels 161–164, respectively. (ii) Controller 140 substantially simultaneously receives clav (1) from interface 111 at input 141, clav (2) from interface 112 at input 142, clav (3) from interface 113 at input 143, and clav (4) from interface 114 at input 144. For example: clav (1)="0" (interface 111 silent), clav (2)="1" (interface 112 active), clav (3)="0" (interface 113 silent), and clav (4)="0" (interface 113 silent). (iii) Controller 140 selects one interface (e.g., active interface 112) and sends a corresponding address (e.g., "0 1") to interface 112 via address bus 120. The active interface sends cells to controller 140 via data bus 130. In case, that two or more of the N interfaces are active, controller 240 optionally selects a single interface for transmission.

FIG. 2 is a simplified block diagram of communication system 200 (hereinafter "system 200") operating in the address polling mode. System 200 has interfaces 211–214, data bus 230 (e.g., also D=8 bits), address bus 220 (e.g., also A=2 bits), or-gate 270, and controller 240. Interfaces 211–214 are coupled to communication channels 261 to 264, respectively. Interfaces 211–214 are also coupled to controller 240 via data bus 230 and address bus 220. Status outputs 251–254 of interfaces 211–214, respectively, are coupled to status inputs 271–274 of or-gate 270, respectively, via status lines for sending status signals clav (1) to clav (4). At output 275, or-gate 270 is coupled to control input 245 of controller 240 (a single pin). Or-gate provides common status bit clav_or to controller 240, for example, according to a multiple logical "or" function:

$$clav\_or = clav\,(1)\text{ or }clav\,(2) \ldots \text{ or }clav\,(N) \tag{2}$$

For system 200, the number $P_2$ of pins is:

$$P_2 = D + A + 1 \tag{3}$$

Number $P_2$ for system 200 is smaller than $P_1$ for system 100. However, clav_or does not indicate which of the interface is active. Therefore, system 200 operates in the addressing mode, for example, with the following, different steps (i), (ii) and (iii):

(i) Interfaces 211–214 receive cells from channels 261–264, respectively.
(ii) In a cycle for each interface 211–214,
 (a) controller 240 sends addresses to interfaces 211–214 via bus 220,
 (b) the interface whose address is on bus 220, generates the clav-signal,
 (c) or-gate 270 substantially simultaneously receives clav (1) from interface 211, clav (2) from interface 212, clav (3) from interface 213, and clav (4) from interface 214, and provides clav_or to controller 240 which indicates that the interface is active or not.
(iii) Controller 240 now selects a single active interface for data transmission (via bus 230) by re-sending an address and the selected interface returns a ready signal to controller 240. For simplicity, the lines carrying the ready signal are not illustrated.

However, such an addressing mode described above requires each interface to identify its address and requires the interface to provide a ready signal. An interface is not allowed to generate the clav signal without receiving an address. Only by receiving and recognizing the received address as appropriate, can an interface obtain permission to send the clav signal. In other words, step (a) has to follow step (b). This recognition and the cyclical nature of step (ii) consume unwanted waiting time:

For example, in a first cycle of step (ii), (a) controller 240 sends address "0 0" to interface 211 via bus 220, (b) interface 211 generates clav (1)="0" (interface not active), (c) or-gate 270 provides clav_or="0" (interface 211 not active). In a second cycle, (a) controller 240 sends address "0 1" to interface 212 via bus 220, (b) interface 212 generates clav (2)="1" (interface 212 active), and (c) or-gate 270 provides clav_or="1" (because interface 211 active). In a third cycle, (a) controller 240 sends address "1 0" to interface 213 via bus 220, (b) interface 213 generates clav (3)="0" (not active), and (c) or-gate 270 provides clav_or= "0". In a fourth cycle, (a) controller 240 sends address "1 1" to interface 214 via bus 220, (b) interface 214 generates clav (4)="0" (not active), and (c) or-gate 270 provides clav_or= "0". Now, in step (iii), controller 240 sends address "0 1" to interface 212 and interface 212 returns the ready signal to controller 240.

System 200 needs less pins than system 100 ($P_2 < P_1$), but clav_or at or-gate 270 does not communicate the same information to controller 240 in system 200 as clav (1) to clav (4) together communicate to controller 140 in system 100. However, as explained above, in system 200, address polling takes more time than direct polling in system 100. The problems of systems 100 and 200 are solved by systems 300 and 400 of the present invention as described in the following.

FIG. 3 is a simplified block diagram of communication system 300 (hereinafter "system 300") operating in the multiplexed polling mode. System 300 comprises interfaces 311–314 at channels 361–364, respectively, address bus 320, data bus 330, and switch unit 301 (dashed frame). Switch unit 301 comprises multiplexer 380 ("MUX") and, optionally, flip-flop 390 ("FF"). To exchange addresses and data, interfaces 311–314 are parallel coupled to controller 340 via address bus 320 and data bus 330. Interfaces 311–314 have status outputs 351–354, respectively, coupled to multiplexer inputs 381–384, respectively, of multiplexer 380 in switch unit 301. Clav-bits clav (1) to clav (4) are present at interface outputs 351–354, respectively. Multiplexer 380 also has data output 385 and control input 386. Data output 385 of multiplexer 380 with signal clav_mux is coupled to input 391 of flip-flop 390. Output 392 of flip-flop 390 with signal clav_mux_ff is coupled to input 346 of controller 340. Flip-flop 390 and controller 340 have inputs 393 and 347, respectively, for optionally receiving clock signal CLK. Flip-flop 390 represents any circuit which can temporarily store data. In the embodiment described here, flip-flop 390 is a D-type flip-flop (D-FF) which transfers the logical state at input 391 (i.e. clav_mux) to output 392 (i.e. clav_mux_ff) when CLK rises and which keeps the logical state unchanged until the next rising edge of CLK arrives. Controller 340 receives, preferably, the same clock signal CLK. In other words, CLK synchronizes the operation of switch unit 301 with the operation of controller 340. To have the same clock signal CLK supplied to flip-flop 390 and to controller 340 is convenient, but not essential. It is enough when flip-flop 390 receives a first clock signal which is substantially synchronized to a second clock signal present at controller 340. Using flip-flop 390 and CLK is convenient, but not essential for the present invention.

Control input 386 of multiplexer 390 is, preferably, coupled to address bus 320 carrying address ADDR. Switch unit 301 forwards the corresponding clav-bit (i.e., clav (ADDR)) to control input 347 of controller 340 for which controller 340 provides an address ADDR. For example, controller 340 provides address "1 0" (i.e. binary number indicating interface for "3") to address bus 320 and multiplexer 380 receiving clav (1) to clav (4) and the address "1 0" forwards clav (3) to flip-flop 390. In other words, the selected status bit which is present at output 385 of multiplexer 380 corresponds to the address ADDR present at address bus 320, that is:

$$clav\_mux = clav\ (ADDR+1) \quad (4)$$

The "+1" results from the counting. Interfaces are counted from 1 and addresses are counted from "0 0".

Preferably, controller 340, busses 320 and 330, and the line between output 392 of flip-flop 390 and control input 346 of controller 340 are coupled together by pins (symbols ○). In the example, the number $P_3$ of pins is $$P_3 = D + A + 1 \quad (5)$$

This number is as low as in system 200. Signal clav_mux_ff does communicate the same information to controller 340 in system 300 as clav (1) to clav (4) together communicate to controller 140 in system 100. In system 300, polling does not take substantially more time than address polling in system 200. This is an important advantage of the present invention in enhancing the overall performance of system 300. Having the address at control input 386 of multiplexer 380 has the further advantage that the address is already available at the active interface (e.g., interface 312) when the status bit of the active interface reaches controller 340. Therefore, handshaking between the active interface and controller 340 can be simplified.

FIG. 4 is a simplified block diagram of communication system 400 (hereinafter "system 400") operating in a combined multiplex-direct polling mode. System 400 comprises address and data busses, interfaces 411–414, switch unit 401 (dashed frame), and controller 440. Interfaces 411–414 correspond to interfaces 311–314, respectively, in system 300 of FIG. 3. The busses and their connections to other elements, as well as the optional clock signal CLK are like in FIG. 3 and not shown in FIG. 4 for simplicity. In switch unit 401, multiplexer 480 and flip-flop 490 are similar to those of unit 301 in FIG. 3. Switch unit 401 has further switch 495 for switching input 446 of controller 440 to output 492 of flip-flop 490 (position Q) or to status output 451 (clav (1)) of interface 411 (position W). Controller 440 further comprises input 442 receiving status bit clav (2) from interface 412, input 443 receiving clav (3) from interface 413, and input 444 receiving clav (4) from interface 414. Preferably, inputs 442–444 are disabled when switch 495 is in position Q.

Depending on the positions of switch 495, system 400 selectively operates (a) in a multiplexed mode as system 300 of FIG. 3 (position Q) or (b) in an direct mode as system 100 of FIG. 1 (position W). In the multiplexed mode (a), the number $P_4$ of active pins is:

$$_QP_4 = D + A + 1 \quad (6)$$

equal to $P_2$ of system 200 and to $P_3$ of system 300. The other, "passive" pins at inputs 442–444 can temporarily be used for other purposes. In the combined node (b), the number $_WP_4$ of pins is calculated as $P_1$ for direct mode system 100.

Figure 5:
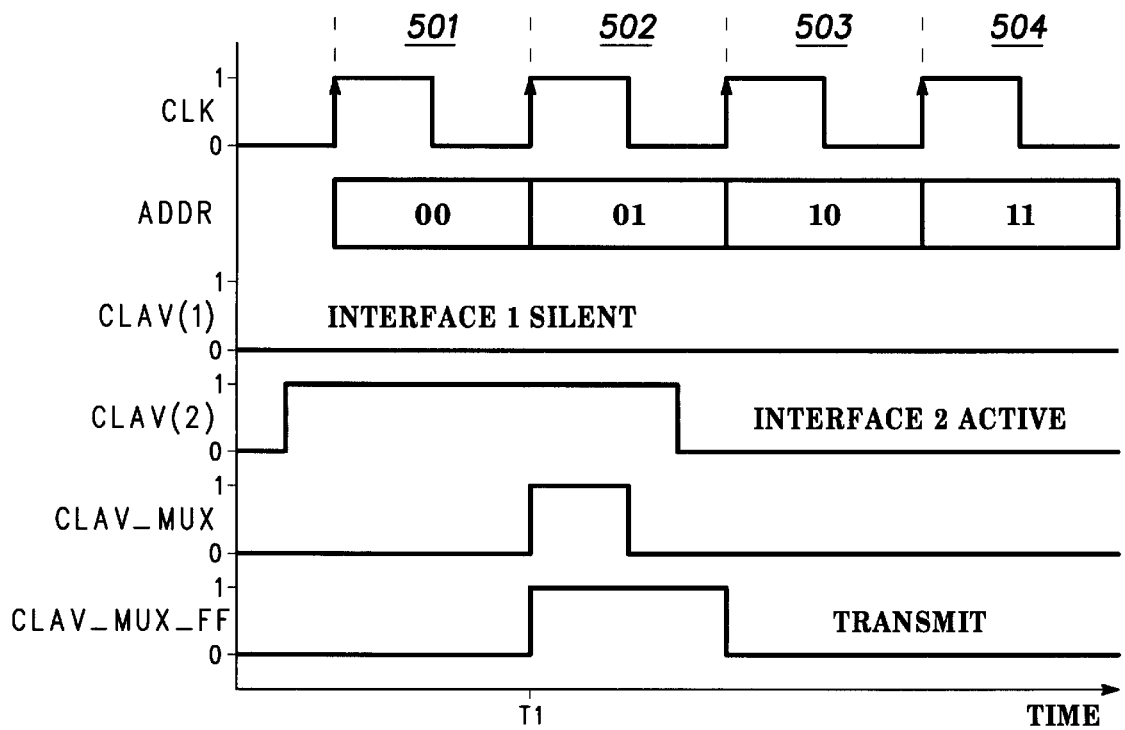
FIG. 5 illustrates a simplified timing diagram for the operation of the system of FIG. 3 by way of example.

FIG. 5 illustrates simplified timing diagram 500 of the operation of system 300 by way of example. The time TIME is given on the horizontal axis. Assuming that interface 312 is active and interfaces 311, 313 and 314 are silent, diagram 500 illustrates:

clock signal CLK alternating between logical "1" and "0" indicating clock cycles 501–504 with "1"-states and "0"-states;

address ADDR present on address bus 320 which is
in cycle 501, "0 0" generated by controller 340,
in cycle 502, "0 1" generated by controller 340,
in cycle 503, "1 0" generated by controller 340,
in cycle 504, "1 1" generated by controller 340;

clav (1)="0" for an assumed silent interface 311, during all cycles 501–504;

clav (2) going temporarily to logical "1" (cycle 501, and part of cycle 502) for interface 312 assumed to be temporarily active;

clav_mux at output 385 of multiplexer 380 which is logical "1" at the beginning of cycle 502 when multiplexer 380 receiving ADDR="0 1" transfers clav (2); and clav_mux_ff at output 392 of flip-flop 390 which is logical "1" in cycle 502.

In the multiplexed mode, system 300 can operate, for example, with the following steps (e.g., only interface 312 assumed active):

(i) Interface 311–314 receive data cells from channels 361–364 and selectively asserts the status bits. The time TIME when the cells arrive and their quantity is, preferably, stochastic and not determined by system 300. Also, the time point T1 when interface 312 has received the predetermined cell number (clav (2) to "1") is not determined. Compared to system 200, interfaces 311–314 in system 300 do not have to wait for a permission to generate an the clav signal. This advantage saves operating time and reduces, among other things, the hardware costs of interface 311–314.

(ii) In switch unit 301, multiplexer 380 substantially simultaneously receives clav (1) from interface 311 at input 381 (cf. diagram 500), clav (2) from interface 312 at input 382 (cf. diagram 500), clav (3) from interface 313 at input 383, and clav (4) from interface 314 at input 384. For example, similar as above: clav (1)="0", clav (2)="1" (interface 312 active during cycles 501 and 502), clav (3)="0", and clav (4)="0". (iii) Switch unit 301 consecutively receives addresses ADDR "0 0" (corresponding to interface 311, cycle 501), "0 1" (interface 312, cycle 502), "1 0" (interface 313, cycle 503), "1 1" (interface 314, cycle 504), again "0 0" (interface 311) and so on from controller 340. Preferably, ADDR changes every time when CLK has a rising edge (arrow). Using multiplexer 301 and flip-flop 390, switch unit 301 provides clav_mux_ff which is logical "0" in cycles 501, 503 and 504 and logical "1" when active interface 312 is polled.

(iv) Active interface 312 starts sending data cells to controller 340 via data bus 330. When two or more of the N interfaces are active, controller 340 can select a single interface for data transmission. This selection can require a further exchange of messages between interfaces 311–314 and controller 340 which can be accomplished by persons of skill in the art without the need of further explanation. Also, step (iv) can be performed after controller 340 has received clav_mux_ff="1".

In FIGS. 3–4 (X=3 or 4), interfaces X11–X14 each are connected to single channel X61–X64, respectively. In the following, a further modification of the present invention is introduced.

Figure 6:
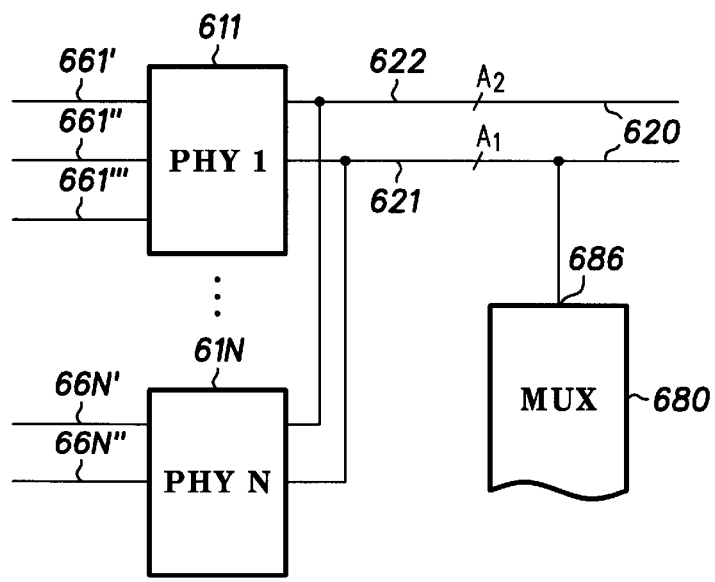
FIG. 6 is a simplified block diagram of a modified address bus coupled to a plurality of modified interfaces.

FIG. 6 is a simplified block diagram of modified address bus 620 coupled to a plurality of N modified interfaces 611–61N. Also, FIG. 6 partly illustrates multiplexer 680 with control input 686. Bus 620, interfaces 611–61N and multiplexer 680 correspond to bus X20, interface X11–X14 and multiplexer X80 in FIGS. 3–4, respectively. For example, interface 611 supports C(1)=3≧1 channels 661', 661" and 661''', and interface 61N supports C(N)=2≧channels 66N' and 66N". For further discussion, C≧1 is the highest number ("MAX") of channels per interface, that is:

$$C = \underset{n=1}{\overset{N}{\text{MAX}}} C(n) \qquad (7)$$

In the example, C=3. Address bus 620 has portions 621 with $A_1$ bits (a subset of bits) to identify the interface and portion 622 with $A_2$ bits (a further subset of bits) to identify the channels. Preferably, the total number A of address bits in address bus 620 is, for example:

$$A = A_1 + A_2 \qquad (8)$$

Conveniently, $A_1$ and $A_2$ are related to N and C, respectively, as follows:

$$A_1 \geq \text{round\_up\_integer} (\log_2 N) \qquad (9)$$

$$A_2 \geq \text{round\_up\_integer} (\log_2 C) \qquad (10)$$

wherein "log" with subscript "2" stands for the binary logarithm and "round_up_integer" stands for the rounded up integer part of a real number (e.g., round_up_integer (4.5)=5). When C=1, then ($\log_2$ 1=0) portion 622 is not required. Preferably, control input 686 is coupled to portion 621 but is not coupled to portion 622. When the interface acknowledges the reception of an address and its active state (see above), the interface conveniently uses the complete A bit address.

In other words, address bus X20 (X=3, 4, 6) has at least $A_1$ address bits and control input X86 receives at least $A_1$ address bits. Address bus 620 can have portion 621 with a $A_1$ bit wide bit subaddress to identify the interface and portion 622 with a $A_2$ bit wide subaddress to identify a channel (cf. the prime markers at the reference numbers) of the identified interface (i.e. having address $A_1$).

Having described details of the operation by way of example, the present invention is now presented as a method for sending interface status information (e.g., clav bits) to a controller. Taking reference to system 300 of FIG. 3 as nonlimiting example, the method steps are:

(a) Interfaces 311–314 selectively assert status bits (clav (1) to clav (4)) every time data (e.g., cells) has been transmitted (to or from system 300) via communication channels 361–364, respectively, above a predetermined quantity (e.g., reaching a predetermined cell number). Thereby interfaces 311–314 provide the status bit independently from address ADDR which is provided by controller 340 and present at address bus 320.

(b) Controller 340 addresses interfaces 311–314 by sending addresses ADDR to interfaces 311–314 via address bus 320.

(c) Multiplexer 380 controlled by addresses ADDR from bus 320 substantially simultaneously forwards the status bit (e.g., clav bit) from the currently addressed interface to controller 340.

Having described details, the present invention is now presented as a network for polling status information (e.g., clav-bits), which are substantially present simultaneously at every PHY (e.g., interfaces X11–X14) of a multi PHY layer, to an ATM layer (e.g., controller X40). The network is characterized by conductive connections (e.g., busses X20 and X30 and switch unit X01) between the multi PHY layer and the ATM layer and a multiplexer (e.g., multiplexer X80) as part of the connections. The multiplexer is controlled by a polling address (e.g., ADDR) from the ATM layer, such that only the status information from the PHY being polled (e.g., ADDR="1 1", PHY 3 polled) is transferred to a single status input (e.g., input X46) at the ATM layer while the status information from the other PHYs (e.g., PHY 1, PHY 2, PHY 4) is substantially blocked (i.e., not transferred).

Further modifications and improvements will occur to those skilled in the art. For example, other communication protocols besides ATM can use the methods and apparatus taught herein. Logical functions can be modified. For example, logical "1" signals can be exchanged by logical "0" signals, and vice versa. Plurality is used herein to mean any number within the range of 2 to infinity and should not be narrowly limited to any particular subrange or constant within 2 to infinity. Also, the size of the busses can vary.

While the invention has been described in terms of particular structures, devices and methods, those of skill in the art will understand based on the description herein that it is not limited merely to such examples and that the full scope of the invention is properly determined by the claims that follow.

What is claimed is:

1. A communication system having interfaces parallel coupled to a communication controller via a data and an address bus, the communication system characterized by a switch unit coupled between said interfaces and said communication controller with data inputs for substantially simultaneously receiving status information from each interface, said switch unit comprising:

a control input for receiving an address from said communication controller via said address bus; and a single data output for forwarding to said communication controller the status information of a single, selected interface for which said communication controller provides an address at said address bus.

2. The communication system of claim 1 wherein said interfaces are N interfaces, said address bus has at least round_up_integer ($\log_2$ N) address bits, and said control input receives round_up_integer ($\log_2$ N) or less address bits.

3. The communication system of claim 1 wherein
(a) said interfaces receive cells from ATM-channels, and
(b) said status information for each interface is a binary indicator for indicating whether (i) the number of received cells has reached a predetermined number, or (ii) the number of received cells has not reached said predetermined number of cells.

4. The communication system of claim 1 wherein said switch unit comprises a multiplexer at said data inputs, and a flip-flop coupled between an output of said multiplexer and said single data output for temporarily storing said status information of said selected interface.

5. The communication system of claim 4 wherein said flip-flop receives a first clock signal which is substantially synchronized to a second clock signal present at said communication controller.

6. The communication system of claim 4 wherein said flip-flop is a D-type flip-flop.

7. The communication system of claim 1, wherein said control input receives an address with a subset of address bits present at said address bus.

8. The communication system of claim 1 wherein said address bus has a first portion with a first subaddress to identify the interface and a second portion with a second subaddress to identify a channel of said identified interface.

9. In a communication system having a plurality of interfaces coupled to a controller by an address bus, a method for sending interface status information to a controller, said method comprising the following steps:

by said interfaces, selectively asserting status bits for each interface every time the interface has transmitted data via a communication channel above a predetermined quantity, said asserting being independent from an address present at said address bus;

addressing said interfaces by said controller which sends addresses to said interfaces via said address bus; and substantially simultaneously forwarding a status bit from the currently addressed interface to said controller by a multiplexer controlled by said addresses from said address bus.

* * * * *

UNITED STATES PATENT AND TRADEMARK OFFICE
CERTIFICATE OF CORRECTION

PATENT NO. : 6,574,228 B1
DATED : June 3, 2003
INVENTOR(S) : Ganor et al.

It is certified that error appears in the above-identified patent and that said Letters Patent is hereby corrected as shown below:

Column 8,
Line 64, change "round_up_integer" to -- round-up-integer --
Line 66, change "round_up_integer" to -- round-up-integer --

Signed and Sealed this

Twenty-ninth Day of June, 2004

JON W. DUDAS
*Acting Director of the United States Patent and Trademark Office*